United States Patent
Koch et al.

[15] 3,694,617
[45] Sept. 26, 1972

[54] APPARATUS FOR FUSION WELDING OF TUBES

[72] Inventors: Hans Koch; Willi Oppermann; Heinz Pfeffer, all of Duisburg, Germany

[73] Assignee: DEMAG Aktiengesellschaft, Duisburg, Germany

[22] Filed: July 31, 1970

[21] Appl. No.: 59,870

[30] Foreign Application Priority Data

Aug. 5, 1969 Germany..........P 19 39 763.8

[52] U.S. Cl. .............................. 219/121 EB, 219/59
[51] Int. Cl. .............................................. B23k 15/00
[58] Field of Search....219/59, 62, 121, 121 EB, 125, 219/125 PL, 60 R

[56] References Cited

UNITED STATES PATENTS

| | | |
|---|---|---|
| 2,927,195 | 3/1960 | Arnaud.................219/124 X |
| 2,927,992 | 3/1960 | Bateman..............219/125 PL |
| 3,585,351 | 6/1971 | Hinrichs..............219/121 EB |
| 3,483,350 | 12/1969 | Pohl....................219/121 EM |
| 3,268,805 | 8/1966 | Normando........219/125 PL X |
| 3,483,550 | 12/1969 | Pohl ..........................219/121 |
| 3,291,959 | 12/1966 | Schleich et al. ...........219/121 |
| 3,152,238 | 10/1964 | Anderson ..................219/121 |
| 3,431,383 | 3/1969 | Ullery.........................219/59 |
| 3,426,175 | 2/1969 | Hahne.....................219/125 |
| 3,539,761 | 10/1970 | Rudd.......................219/121 |
| 3,308,264 | 3/1967 | Ullery......................219/121 |

*Primary Examiner*—J. V. Truhe
*Assistant Examiner*—Gale R. Peterson
*Attorney*—McGlew and Toren

[57] ABSTRACT

This invention relates in general to a method and apparatus for welding tubes from a metal sheet which is formed into a tubular configuration with a longitudinally extending slot or welding gap, and which includes sensor means adjacent the slot for accurately positioning a welding device. The welding device comprises an electron beam welder having means associated therewith for shifting the beam or the holder for the beam welder in accordance with the position of the longitudinal slot of the formed tube prior to welding. The position of the beam may be regulated by deflecting it electrostatically or electromagnetically and the feeler or sensor which is associated with the formed slot of the tube is connected either electrically or mechanically for effecting the shifting of the beam. The sensor may comprise a three-pole magnet having windings between adjacent poles and which is oriented over the gap of the tube to be welded and which is connected so that the variations of voltage in the windings caused by the shifting of the gap of the tube which is to be centered in respect to the welding apparatus will provide the necessary control pulse for the shifting of the electron beam for centering it during the welding. The same control may be effected by a mechanical shifting device, by an air deflecting device, or by a mirror operated arrangement.

9 Claims, 9 Drawing Figures

APPARATUS FOR FUSION WELDING OF TUBES

SUMMARY OF THE INVENTION

This invention relates in general to a method and apparatus for welding and, in particular, to a new and useful method and apparatus for carrying out fusion welding of tubes from a sheet which is formed into a tubular form with a longitudinally extending slot which is used as a welding gap and wherein an electron beam welder is employed with a beam which may be shifted in accordance with the positioning of the slot as it is fed into association with the beam.

For spiral welding as well as for continuous longitudinal welding, the usual methods employed involve the use of argon arc welding, under powder welding, or high frequency welding. The argon arc method which is carried out under a protective gas shield or gloove is used almost exclusively for the manufacture of tubes made of stainless steel. Inherent of all of the known tube welding methods is the disadvantage of relatively slow production rates. The under powder welding method is also very expensive and rather complicated from the aspect of the equipment required. Besides the drawback of a relatively slow production rate, the tube welding methods often require an undesirably great height of the internal welding seam. They also require generally wide heating zone to the left and to the right of the welding gap where structural transformations of an undesired kind are apt to take place. Accordingly, the technical metallurgical conditions are part of the factors involved in efforts to improve production rates such as being able to process with the same or increase feed rates, heavier tube wall thicknesses.

In accordance with the present invention, a greater production rate at optimal conditions technically and metallurgically is possible and in addition, the quality of the weld is improved by avoiding too high an internal welding seam even when heavier tube wall thicknesses are involved. These conditions are also applicable to hard to weld materials such as stainless steel. The invention method and arrangement is carried out by use of an electron beam gun which produces an electron beam in a vacuum and includes a part of the length of the beam which extends into the open air into the welding gap formed between the edges of a metal sheet which is formed into a tubular form. The inventive method provides a control for the impacting or penetrating of the beam to the gap center during the motion of the tube through the apparatus. A principal advantage of this welding method over the protective gas or under powder welding methods lies primarily in the achievement of a far greater production rate and in an exactly an adjustable internal welding seam height as well as an extremely narrow structural transformation zone due to the very narrow and sharply focused electron beam employed for the welding. Electron beam welding as such as known but not for tube welding because the concentration of the electron beam made all possibilities of its application to tube welding appear unfeasible up to the time of the present invention. The very small point of impact of the electron beam requires a welding gap which runs with precision beneath the beam so that the beam may be accurately centered in respect thereto and this was unobtainable before the arrangement of the present invention. The traditional tube forming machines and the geometric conditions of the strip material which must be formed into the tube exclude tube welding by means of electronic beams.

The application of an electron beam for tube welding may take place in accordance with the invention either in open air or with an electron beam produced in vacuum with part of its length extending into the open air or it may take place in a vacuum in which the tube is led through an evacuated chamber. It is precisely the great energy concentration of the electron beam in which the metallurgical advantages of the method lie, since it permits better heat distribution to the two abutting metal edges of the strip material which is to be formed into the finished tube. Leading the electron beam over the welding gap also permits various angular positions of the electron beam. The method of the invention is particularly suited for those tube forming methods in which the material edges are moved toward each other as the tube to be welded approaches the welding device. Therefore, the open angle prevailing at any moment between the edges of the formed sheet which are being formed into a tubular configuration allows the electron beam to penetrate advantageously up to an orientation which almost coincides with the plane of the tube surface.

In the development of the method according to the invention, the electron beam is deflected electrostatically or electromagnetically following the course of the abutting sheet metal edges by arranging the deflecting means in the sector of the beam extending immediately above the welding gap. A particular advantage of the welding method therefore is the inertia less control with which special accuracy can be obtained.

With the invention method, the edges of the sheet metal which are constantly being urged into a tubular configuration and which then form a longitudinal gap along the tube length are scanned either: electromagnetically, electromechanically, pneumatically, or optically and any variation of the position of these edges may be employed for the accurate controlling of the precise position of the electronic beam. The measuring or sensing means includes differential measuring methods which offer the advantage of generating an output signal proportional in polarity and amplitude to the deviation of the edges of the strip material from the precise welding point.

The invention contemplates the movement of the electronic beam in an oscillating fashion over the welding gap. The generation of the electronic beam alone entails the possibility of modifying the effective beam length. Therefore a dual possibility of regulating the amount of heat supplied and the distribution is contained in the suggestion to move the electron beam in an oscillating fashion.

The apparatus for carrying out the method of the invention includes a movable holder for an electron beam gun attached to the gun and provided with a drive mechanism which is controlled by means of a sensor or feeler which is arranged in the welding gap between the edges of the sheet metal being formed into the tube. The sensor provides a sensing of the deviations in the travel of the welding gap center due to inaccuracies caused by the tube manufacture or as a result of merely temporary narrowing or widening of the gap which may be produced by material tensions or by production tolerances. One particularly advantageous machine includes a hollow holder which surrounds the tube cross section and which is mounted so as to rotate around the tube center which is defined by a passage through which the tube to be welded is moved. The tube holder is shifted by a power transmission which is driven by an electric motor for shifting a holder with the electron beam gun welding in accordance with variations in the gap of the tube being fed to the welding device. The holder is capable of oscillating to the left or to the right about the longitudinal axis of the tube and the required movement of the holder by actuation of the motor is effected by the feeler arranged between the edges of the tube to be welded. Such a design of machine is suited specifically for tubing with longitudinal seams.

A further feature of the invention provides means for mounting the electronic gun so that it will be shiftable about a horizontal pivotal axis on its mounting and about the arm of the holder having an axis which extends perpendicular to the longitudinal axis of the tubing. This makes it possible to position the electron beam obliquely in respect to the tube to be welded, either in a direction opposite to the direction of tube travel or toward the direction of tube travel.

Since a sensitive control of the welding control, in accordance with the position of the gap of the tube, may be effected by electronic means in accordance with a further feature of the invention the electron beams output or impact point is movable either electrostatically by means of capacitor plates which are subjected to a voltage which is proportional to the deviation picked up by the sensor, or electromagnetically by means of coils fed by current controlled in proportion to the deviation picked up by the feeler.

According to another characteristic of the invention, the feeler comprises a three-legged magnet which has a center leg which is aligned above the gap formed by the sheet after it is bent into a tubular configuration and which is located between the edges of the sheet at the longitudinal center line of the slot formed so that the winding around each leg provides a voltage differential which may be utilized as a signal for the control of the drive for moving the holder for the electron beam. The signals obtained may be used for the deflection of the beam itself or for the mounting of the mechanism for generating the beam. A combination of these motions may be employed: for example, a large motion may be dealt with by moving the holder for the electron beam welder, and a small deviation may be used to deflect the electron beam itself. A mechanical scanner may be employed as a feeler which includes two leg portions which are deflected by the deflection of the side edges of the formed sheet for the purpose of indicating the proper alignment of the longitudinal gap for receiving the weld. A pneumatic feeler may also be employed which includes tubular nozzles which are oriented against the edges of the sheet and which will indicate differential pressures at the discharge of the nozzles which may occur during the movement of the edges for the purpose of controlling the location of the holder and the electron beam. Another type of feeler may comprise a light reflecting device which may be oriented to sense the position of the edges of the sheet to be formed into the tube and the beams may be reflected by minors to one or more photocells for the generation of an electrical differential value which serves as a signal for the control of the drive for the holder of the electron beam or for varying the beam itself.

Accordingly, it is an object of the invention to provide an improved method of forming welded tubes from a continuously fed sheet which is formed into a tubular configuration with a longitudinal slot extending therealong which comprises sensing the position of the edges of the sheet which is to be formed into the tube at the location of the welding gap between the shaft edges and controlling the location of the centering of an electron beam by varying the position of the beam in accordance with the location of the edges bounding the slot to be welded.

A further object of the invention is to provide a device for the continuous longitudinal seam welding of a sheet which is formed into a tube having abutting edges adjacent the longitudinal slot which is to receive the welding material which comprises a holder mounting an electron beam device and sensing means associated with the tube being formed to sense the location of the edges to be joined and for moving said holder and said electronic beam in accordance with the position of the slot.

A further object of the invention is to provide a device for continuously welding strips or sheets of metal which are formed into a tubular configuration with a longitudinal slot therealong which comprises means for sensing the position of the slot as it is fed past a welding device and means for shifting the welding device in accordance with the sensing and wherein the welding device is advantageously an electron beam which also generates a welding beam which may be shifted in response to the sensing.

A further object of the invention is to provide a apparatus for sensing the position of the abutting edges of a tube having a longitudinal slot between the edges which is to be welded which comprises means such as an electrical, pneumatic, visual, or mechanical element for indicating the position of the edges of the tube and for generating a signal proportional to the movement of these edges from a predetermined location, and means responsive to the signal for varying either the location of an electron beam welder or the location of the beam which is directed outwardly from an electron beam gun.

A further object of the invention is to provide a device for the continuous welding of tubes which is simple in design, rugged in construction and economical to manufacture.

The various features of novelty which characterize the invention, are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

GENERAL DESCRIPTION OF THE PREFERRED EMBODIMENTS

Figure 1:
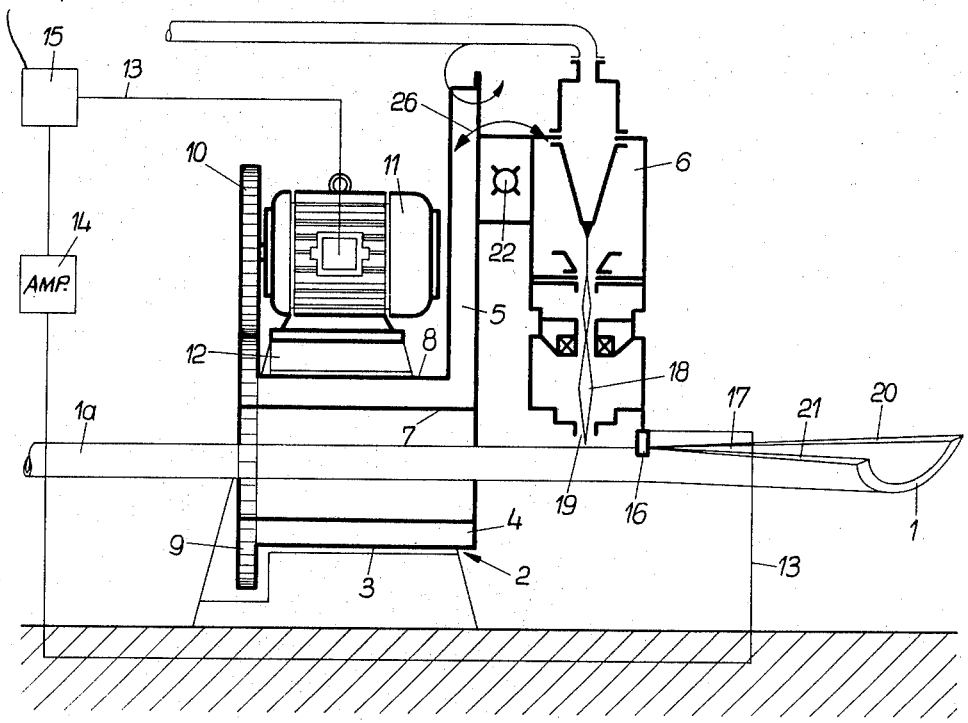
FIG. 1 is a partial side elevational view of a device for the continuous electron beam welding of tubes.

Referring to the drawings in particular, the invention embodied therein comprises a welding device for continuously welding strips of metal material 1 after they have been formed into a tubular configuration with a longitudinal slot or welding gap 17 defined therealong and subsequently to form them into welded tubes 1a. The welding device 2 includes an electron beam holder or support member 4 which includes an arm portion 5 which supports an electron beam gun 6. The holder is made up of sheet metal elements 7 and 8 and is hollow on its interior and includes a ring gear at one end which meshes with a gear 10 of a drive motor 11. The drive motor 11 is mounted on a fixed bracket 12 of the welding device 2. Sensing means in the form of a sensor or feeler 16 is located so as to be in the gap 17 or directly above the gap 17 in a position to sense the positioning of the two incoming edges 20 and 21 in order that the slot or gap 17 be accurately positioned in respect to the electron beam gun 6. Variations of the edges 20 and 21 from a desired position produces an electrical pulse in the line 13 which connects to a regulating amplifier 14 and a positioner 15 which is connected to the motor 11 for accurately positioning the gear 10 and hence the holder 4, with the electron beam gun 6, in accordance with the sensed information.

Figure 2:
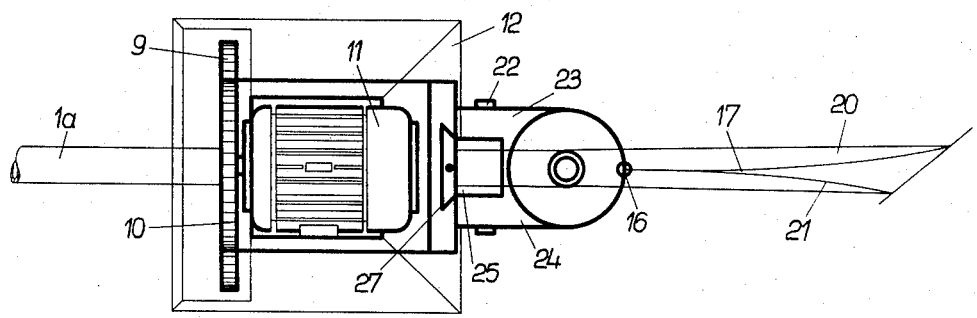
FIG. 2 is a top plan view of the apparatus indicated in FIG. 1.

As indicated in FIGS. 1 aNd 2, the electron beam gun 6 generates in an electron beam 18 which discharges from the gun through the aperture 19 to impact on the tube 1 through which the complete fusion of the two sheet metal edges 20 and 21 takes place. The tubing thus welded has a longitudinal seam and is designated 1a.

The electron beam gun 6 is mounted for displacement on the arm 5 on a pivot shaft 22 which is mounted in side parts 23 and 24 in a fixed non-rotatable position but which can turn in the projection 25 of the arm 5. The beam gun 6 can be pivoted in the directions of the arrow 26 so that the electron beam 18 may enter the welding gap 17 in an oblique direction. The height of the beam may also be adjusted by the sliding movement of the projection 25 of the arm 5 in dove-tailed guideways 27 as shown in FIG. 2.

The drive motor 11 advantageously comprises a direct current shut motor which may be equipped with a reduction gear if applicable. A direct shut motor may be fed without trouble from an a.c. network by means of controlled rectifiers of greater output such as thyratron and ignition tubes. The regulating amplifier 14 and the positioner 15 may, of course, be replaced by an electronic regulating system, for instance, with a control for the armature and a control for the field of the motor. Since a constant torque occurs from both directions of rotation of the holder 4, and in both adjustment ranges a variation of the armature circuit is particularly suited.

Figure 3:
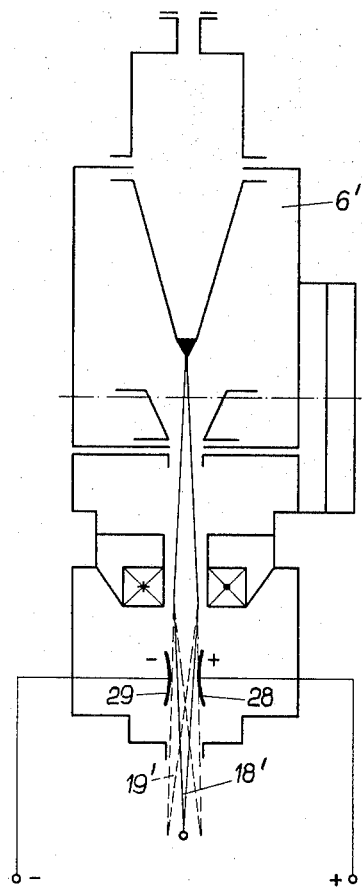
FIG. 3 is an enlarged sectional view of an electron beam generating device for use in the welding machine of FIG. 1.

Referring to the construction of the electron beam gun 6' indicated in FIG. 3, the electron beam 18' exits through an aperture 19'. In order to provide some regulation and deflection of the beam as it is directed through the aperture 19, means are provided for controlling the position of the beam 18 which includes in the embodiment of FIG. 3, two capacitor plates 28 and 29 between which the electron beam 18 runs just prior to its movement through the aperture 19. The capacitor plate 28 is connected to a positive terminal and the capacitor plate 29 to a negative potential. The deflection voltage is controlled in accordance with the sensing accomplished by the sensor 16 and it is supplied to the capacitor plates in a proportion to cause the control deviation of the electron beam 18' for example between the two outer dotted line positions indicated.

Figure 4:
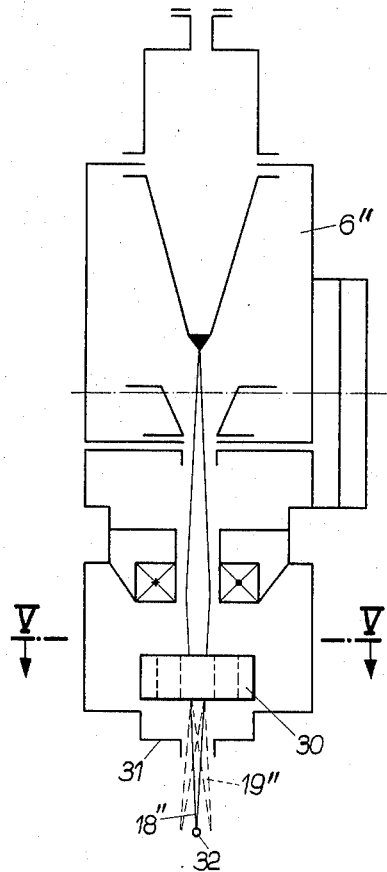
FIG. 4 is a view similar to FIG. 3 of another embodiment of the invention.
Figure 5:
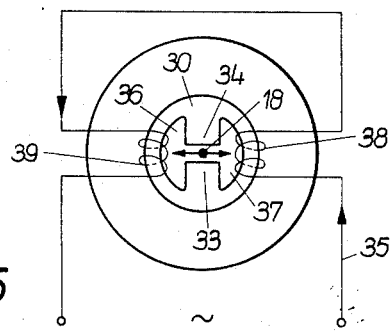
FIG. 5 is a section taken along the line V—V of FIG. 4.

In the arrangement of FIG. 4, there is provided an electron beam gun 6" which includes an arrangement of a magnetic coil 30 immediately before an aperture 19" for influencing the direction of the beam 18". The electron beam 18" may be focused on a fusion point 32 at a certain distance from the housing 31 and the point of engagement for welding will be determined by the actuation of the magnetic coil 30. The magnetic coil 30 has two magnetic poles 33 and 34 opposing each other. Depending on the magnitude of the deflection of current as indicated by the arrow 35, the fusion point 32 is shifted in accordance with the arrow directions 36 and 37 as shown in FIG. 5. This effect is caused by the two magnetic coils 38 and 39 which are in series in their electrical wiring but which are in parallel in the magnetic circuit. The impulse current 35 for actuating the coils is, of course, supplied by the sensor 16.

Figure 6:
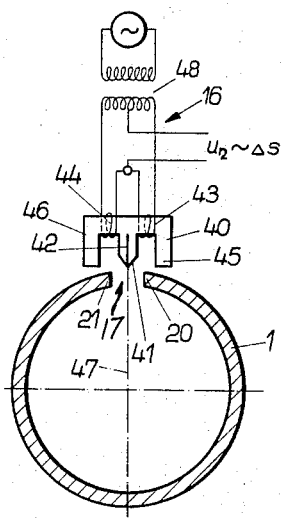
FIGS. 6, 7, 8 and 9 are partial transverse sectional views of a sheet formed into a tubular configuration with feeler or sensor means associated therewith for indicating the position of the abutting edges of the longitudinal gap formed by the sheet before the tube is finally welded.

In FIG. 6, there is indicated a sensor 16 which is formed as a three legged magnetic yoke 40 having a central leg 41 which is centered in the gap 17 and it includes two half portions with magnetic coils 43 and 44 which extend between legs 45 and 41 and 41 and 46 respectively. The central magnetic part 41 is divided into two halves and is provided with insulation 42 so that one of the magnet coils 43 and 44 forms a magnetic circuit with respective halves of the magnetic yoke 41 and the respective outer leg 45 or 46 are located over the respective sheet metal edges 20 and 21. As soon as the sheet metal edges 20 or 21 move away symmetrically from the center yoke 41, that is that they migrate away from the longitudinal axis 47 of the tube to one or the other or both sides, there results a voltage differential which is tappable between the two field coils 43 and 44 and a preceding transformer 48. The voltage differential serves as an output signal for the control of the drive system 11 or for the regulation of the electronic beam 18.

Figure 7:
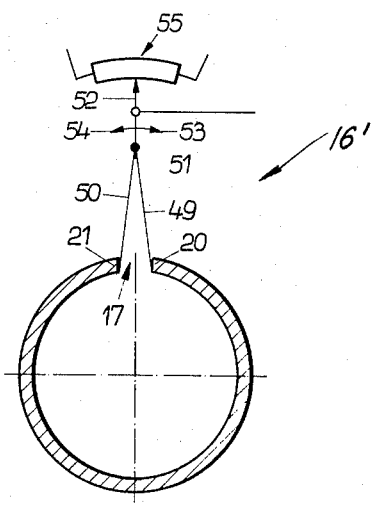

In FIG. 7, there is indicated a mechanical sensing device, generally designated 16', which includes movable elements 49 and 50 which pivot about a shaft 51 and which move a member 52 toward one of the arrow indications 53 or 54. Depending upon the position of the welding gap 17. This results in a different voltage drop at the potentiometer or inductive angle settter 55 which can be used for moving the position of the holder 5 or the electron beam 18. This construction acts electromechanically.

Figure 8:
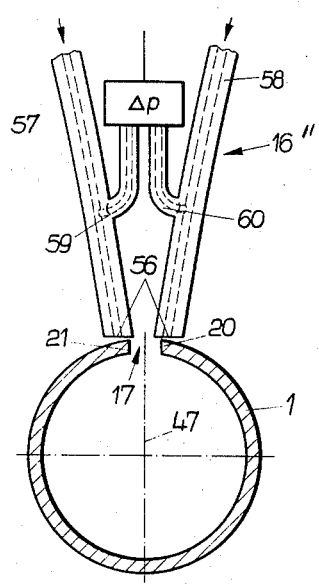

A pneumatic sensor 16" is indicated in FIG. 8 and it includes two tube nozzles 56 which are so oriented to the sheet metal edges 20 and 21 that when these edges shift away from or closer to the longitudinal axis 47, of the tubing 1, varying amounts of air will escape from the tube nozzles 56. This causes the build up of pressure inside the channels 57 and 58 respectively to change and this can be compared with one another by means of the branch lines 59 and 60, respectively. The size of the differential pressure $p$ is the basis for a signal for the control of the rotational drive system 11 for the positioning of the beam 18.

Figure 9:
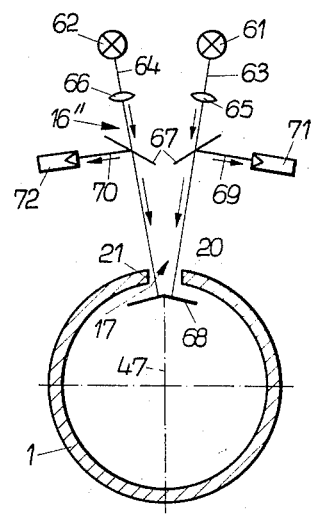

An optical system using a dual light barrier is shown in FIG. 9. Light beams 63 and 64, from the light sources 61 and 62, pass through the optic 65 and 66 for focusing. Semitransparent mirrors 67 are respectively provided which permit the passage of light beams in the direction toward the sheet metal edges 20 and 21 up to a mirror 68. The mirror 68 reflects the light beams 63 and 64 as long as the sheet metal edges 20 and 21 are kept out of the path of the light rays. From the semitransparent mirrors 67, the reflected light beams 69 and 70 hit photocells 71 and 72. Therefore, the sheet metal edges are in their proper position with respect to the longitudinal axis 47 of the tubing as long as the photocell current flows. An interference of the course of the beams involuntarily leads to the required output signal of the dual light barrier so that the rotational drive motor 11 moves with the electron beam gun 6 back and forth in such a manner that the sheet metal edges 20 and 21 again run symmetric to the longitudinal axis 47 of the tubing and this means that the center of the welding gap 17 coincides again with the longitudinal axis 47 of the tubing.

What is claimed is:

1. A device for diffusion welding of tubes from sheets comprising an electron beam holder, an electron beam gun for directing an electron welding beam, means mounting said electron gun on said holder in a position to direct the electron welding beam in a selected direction, feed means for feeding sheet material to form it into a tube having longitudinal side edges which are opposed on each side of a longitudinally extending welding gap and for feeding the tube thus formed past the beam of said electron beam gun, and sensing means oriented adjacent the longitudinal edges of said tubular member for sensing variation of the edges from a predetermined position as it is fed, mounting means mounting said holder for rotation about the axis of the tube which is being formed, shifting means connected to said sensing means and to said mounting means to rotate said holder with said electron beam gun for varying the position of said holder and the electron beam directed outwardly from said gun in accordance with the variations sensed and to position said beam in accordance with the position of the welding gap as determined by the sensed positions of said side edges, said feed means being effective to move the tube past said beam to cause it to be welded by said beam along said gap to form a continuous longitudinal seam.

2. A device, according to claim 1, wherein said shifting means includes a drive motor connected to said holder, said sensing means being connected to said motor to operate said motor in accordance with the variations of the longitudinal edges from a predetermined position.

3. A device, according to claim 1, wherein said holder comprises a hollow housing forming a passage for the tube which is formed with a longitudinal weld seam after it passes said electron beam gun, said means for shifting said beam including a driving member connected to said holder for rotating said holder to shift the position of said electron beam.

4. A device, according to claim 1, wherein said holder includes a mounting for an electron gun permitting pivotal and vertical adjustment of said gun.

5. A device, according to claim 1, including control means disposed at the discharge of said electron gun for varying the direction of impact of said electron beam on said tube connected to said sensing means.

6. A device, according to claim 1, wherein said sensing means comprises a three legged magnetic yoke having a central leg aligned centrally above the welding gap and having a coil winding on each portion between said outer legs having a voltage potential, each coil winding being variable in potential in accordance with the position of the edges of said sheet.

7. A device, according to claim 1, wherein said sensing means includes a mechanical scanner having elements in engagement in each of said side longitudinal edges of said sheet and being movable in accordance with movement of said side edges to provide a control pulse, and a potentiometer circuit connected to said gun, said control pulse being connected to said potentiometer circuit.

8. A device, according to claim 1, wherein said sensing means includes a pneumatically operable tube nozzle oriented over each of said side edges and means for indicating the differential pressure between said tubes in accordance with the movement of the side edges for generating a control pulse for varying the position of said electron beam.

9. A device, according to claim 1, wherein said sensing means includes a light beam oriented to direct a light ray over each of said side edges, mirror reflection means for directing a partial beam reflected from said side edges to a photocell, each of said photocells generating a differential value providing a control signal for varying the position of said electron beam.

* * * * *